United States Patent [19]
Fujita et al.

[11] 3,773,155
[45] Nov. 20, 1973

[54] VEHICLE CLUTCH RELEASE MECHANISM

[75] Inventors: Saburo Fujita; Yujiro Takikawa; Masanori Mori, all of Kariya, Japan

[73] Assignee: Aisin Seiki Kabushiki Kaisha, Kariya City, Aichi pref., Japan

[22] Filed: June 18, 1971

[21] Appl. No.: 154,531

[30] Foreign Application Priority Data
June 18, 1970 Japan.............................. 45/60191
July 13, 1970 Japan.............................. 45/69950

[52] U.S. Cl.......... 192/70.25, 192/70.28, 192/89 B, 192/111 B, 267/153
[51] Int. Cl............................................. F16d 13/50
[58] Field of Search...................... 192/70.28, 70.25, 192/70.29, 85 A, 89 R, 89 B, 111 A, 111 B; 188/72.3, 216; 267/63 R, 153

[56] References Cited
UNITED STATES PATENTS

| | | | |
|---|---|---|---|
| 3,702,651 | 11/1972 | Fujita et al........................ | 192/70.25 |
| 3,493,221 | 2/1970 | Moldzanowski...................... | 267/63 |
| 3,315,951 | 4/1967 | Boschi et al. ................. | 267/63 R X |
| 2,872,774 | 2/1959 | Fink................................ | 267/153 X |
| 3,700,084 | 10/1972 | Nasu et al........................ | 192/70.28 |
| 1,324,501 | 12/1919 | Gerdeman .................... | 192/70.28 X |
| 1,371,391 | 3/1921 | Ollard.......................... | 192/70.28 X |
| 3,128,862 | 4/1964 | Ludwig............................ | 192/70.28 |
| 3,166,167 | 1/1965 | Kinsman ...................... | 192/85 A X |
| 3,421,604 | 1/1969 | Hobbs......................... | 192/111 A X |
| 3,584,720 | 6/1971 | Bark et al. ...................... | 192/70.28 |

FOREIGN PATENTS OR APPLICATIONS

| | | | |
|---|---|---|---|
| 570,236 | 1/1924 | France............................ | 192/70.29 |
| 1,926,431 | 5/1969 | Germany ........................ | 192/70.28 |

*Primary Examiner*—Allan D. Herrmann
*Attorney*—Richard C. Sughrue et al.

[57] ABSTRACT

The invention relates to a vehicle clutch release mechanism adapted for actuation in the release stage of the clutch disc assembly so as to separate the assembly from engagement with a flywheel rotatable in unison with an input shaft, said assembly being axially shiftable and unitarily rotatable on an output shaft.

The improvement resides in the provision of resilient means preferably formed into a rubber ring or tube which is adapted for accumulating a resilient thrust energy during the engagement of said clutch disc assembly with the flywheel and for release of said accumulated thrust energy during a clutch release operation for positively and resiliently separating said assembly from contact with said flywheel.

5 Claims, 6 Drawing Figures

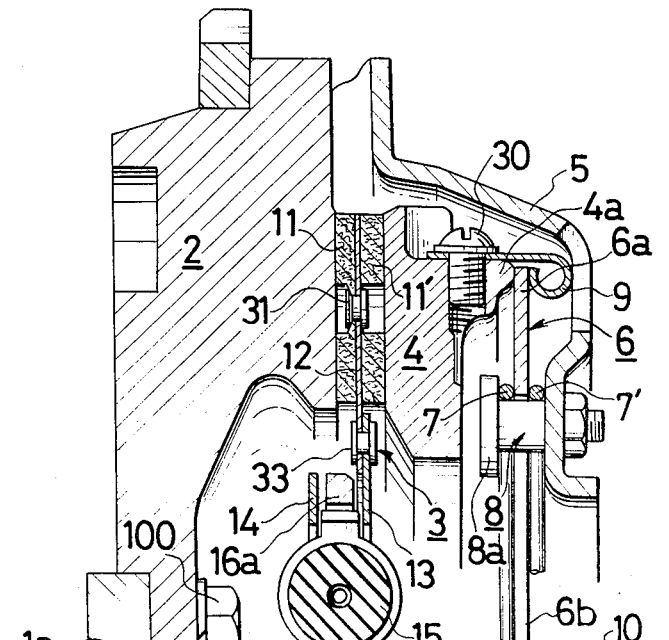
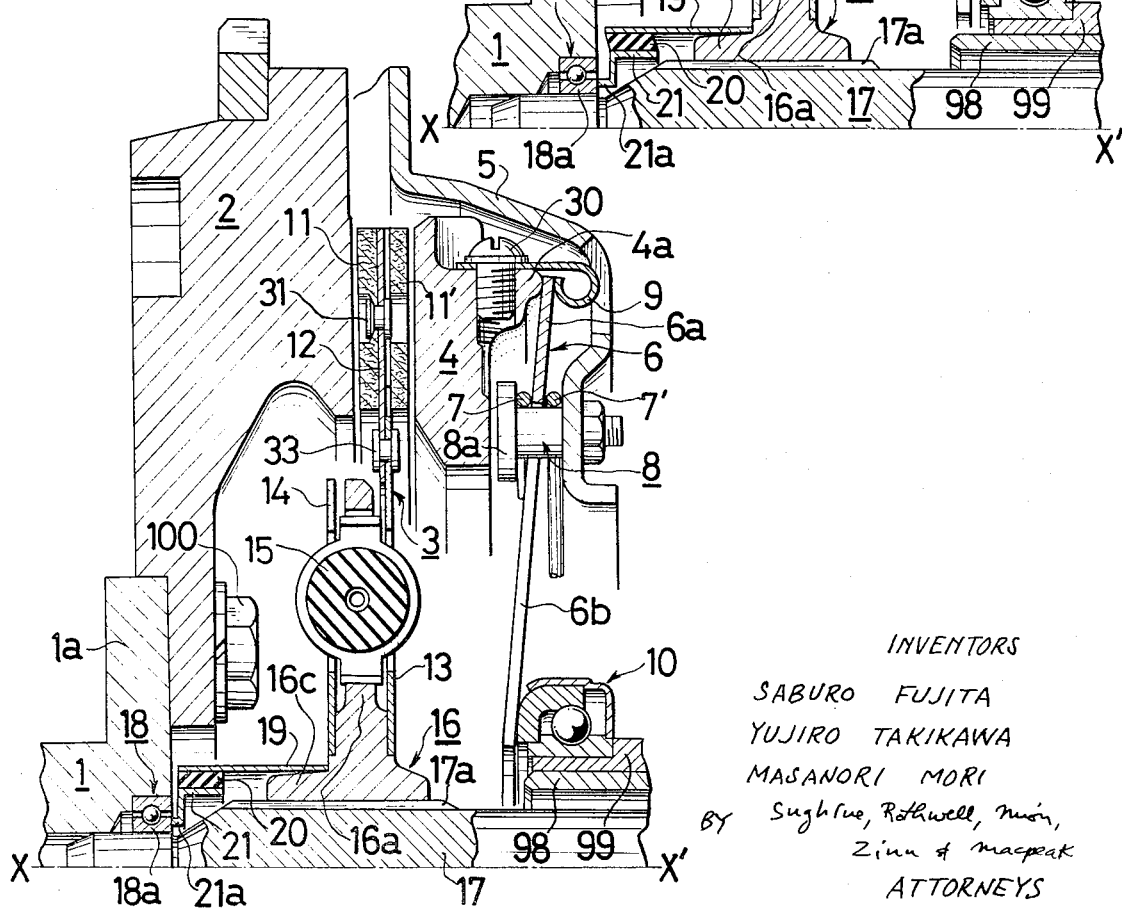

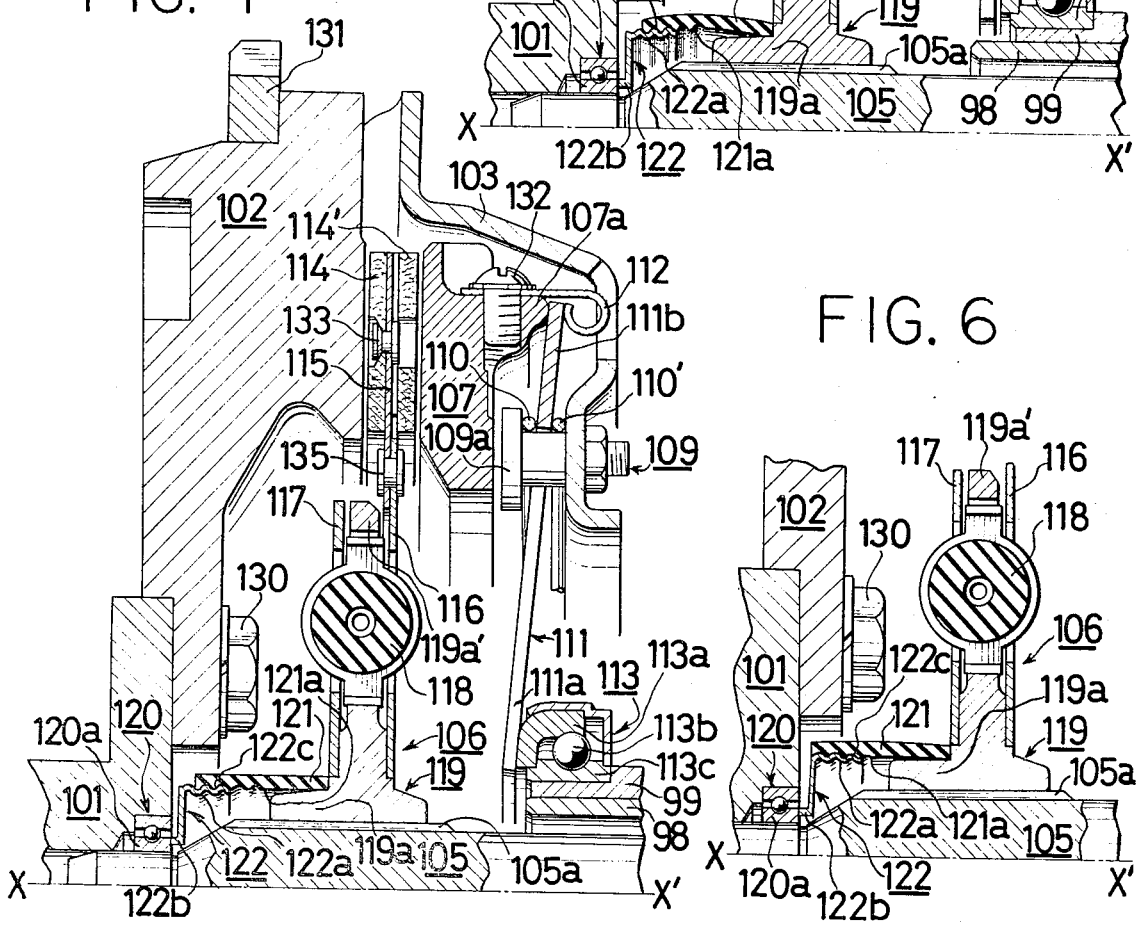

VEHICLE CLUTCH RELEASE MECHANISM

This invention relates to improvements in and relating to vehicle clutch release mechanisms, especially adapted for use on automotive vehicles.

Generally speaking, conventional clutch release mechanisms are fitted with no positive clutch release means for positive release of clutch disc plate assembly from engagement with the flywheel fixedly mounted on the input shaft consisting generally of the crankshaft of the vehicle drive engine. Most of these conventional clutch release mechanisms rely upon negative means such as engine vibration or the like. Said clutch disc plate assembly is mounted between the flywheel and an axially shiftable pressure plate and fitted with facing or friction elements adapted for engagement with said flywheel and pressure plate on the one hand, and is mounted through its boss axially slidably on, yet rotatable in unison with an output shaft, on the other hand. This output shaft is arranged concentrically with the input shaft and relatively rotatable therewith, as conventionally. Since the clutch disc plate assembly is coupled through a spline connection with said output shaft, a substantial sliding resistance is encountered thereat, even upon axial movement of said pressure plate in its clutch releasing direction, resulting in a substantial retardation in the clutch release movement of the clutch disc assembly and thus the remaining effective engagement of the clutch facing element with the flywheel inviting an entrained rotation of the assembly. This residual phenomenon gives rise to gearing cricks and creep phenomenons in the related mechanical parts and represents naturally a substantial drawback encountered in prior art.

Especially recently, however, positively acting clutch release or disengaging mechanisms have been developed. A grave drawback encountered with use of these prior proposals resides in such that with increase of clutch facing wear, the release gap between the facing and the flywheel becomes non-constant and thus fluctuating which results in a substantial difference in clutch release response or feeling felt by the vehicle driver in his clutch release operation. Other proposals provide highly complicated and thus correspondingly costly clutch release means even if they may be of the positively acting type, which disadvantageous feature has presented these prior mechanisms from being utilized in practical purposes.

It is therefore the main object of the present invention to provide a unique and highly simplified clutch release mechanism of the positively acting type, yet capable of obviating the various conventional drawbacks as above referred to.

This and further objects, features and advantages of the invention will become more apparent when reading the following detailed description of several preferred embodiments of the invention by reference to the accompanying drawings.

In the drawings:

FIG. 1 is substantially a half of an axial section of a first embodiment of the invention wherein the clutch is seen in its engaged position.

FIG. 2 is a similar view to FIG. 1, wherein, however, the clutch has been disengaged and the clutch mechanism according to this invention has been brought into actuation.

FIG. 3 is a similar view to FIG. 1, illustrating, however, a second embodiment of the invention.

FIG. 4 is a similar view to FIG. 2, illustrating the second embodiment.

FIG. 5 is a part of FIG. 4, wherein, however, the clutch facing elements have not yet been subjected to wear.

FIG. 6 is a similar view to FIG. 5, wherein, however, the clutch facing elements have been subjected to substantial wear.

Referring now to FIGS. 1–2 of the accompanying drawings, the first embodiment of the invention will be described hereinbelow in detail.

In these figures, the numeral 1 represents only partially a crankshaft of an internal combustion engine, not shown, fitted on an automotive vehicle, again not shown, an end flange 1a being provided at the shown end of said crankshaft and made integral therewith. A flywheel 2, only partially shown, is concentrically and fixedly attached to the shaft flange 1a by means of a plurality of fixing bolts of which only one is shown representatively at 100.

Numeral 3 represents schematically and only partially a commonly known clutch disc assembly which is normally squeezed between said flywheel 2 and a pressure plate 4 concentrically arranged and only partially shown, for transmitting drive torque transmitted from said engine crankshaft 1, to a conventional transmission gearing or other means, not shown, through an output shaft 17 which is shown only partially again.

A conventional cover plate 5, only partially shown, is attached concentrically and fixedly to the flywheel 2 by means of a plurality of fixing bolts, not shown. A diaphragm spring 6, only partially shown, is mounted on the cover plate 5 by means of a plurality of rivet members of which only one is shown representatively at 8; this diaphragm spring exerts an axial pressure upon the pressure plate 4 in its actuating direction.

A first pivot ring 7 formed into a large wire ring is inserted, as shown, between the enlarged head at 8a of said rivet member 8 and diaphragm spring 6, and in the similar way, a second pivot ring 7' of similar configuration as above is kept in position between diaphragm spring 6 and cover plate 5, so as to maintain the aforementioned relative position of the members 5, 6 and 8. These parts are so designed and arranged that the peripheral ring part 6a of the diaphragm spring 6 urges the pressure plate 4 by pressure contact with a ring-shaped projection 4a of said pressure plate 4 in the leftward axial direction when seen in FIGS. 1 and 2, so as to maintain the clutch disc assembly 3 in its pressurizedly squeezed position between flywheel 2 and pressure plate 4.

Numeral 9 represents a retracting spring the axially inner part of which is fixedly attached to the outer periphery of said pressure plate 4 by means of a set screw 30. The axially outer part of the retracting spring 9 represents a semi-circular curved cross-section as shown and kept in pressure contact with the outer-most part of the ring-shaped part 6a of diaphragm spring 6, so as to urge the latter to abut against the pressure plate 4. In practice, however, a plurality of these retracting springs 9 and its respective fixing screws 30 are arranged radially and separately around the axis X–X' of the mechanism, although not shown.

When the radially and centrally extending arms 6b of said diaphragm spring 6, although shown representatively only one, are subjected to an axial pressure by release bearing 10 in clutch release operation as will be more fully described hereinafter, the aforementioned pressure contact between 6a and 4 will well serve for drawing forcibly of pressure plate 4 back towards cover plate 5.

Numeral 11 represents a conventional disc facing member provided at the flywheel side; and numeral 11' represents a similar member provided at the pressure plate side. These disc facing members 11 and 11' are substantially fixedly attached to the respective sides of a disc spring 12 by means of a plurality of fixing rivets of which only one is shown representatively at 31. The inner periphery of the disc spring 12 is fixedly attached as at 33 to main disc plate 13. These rivets 31 are so designed and dimensioned that these members 11 and 11' can move axially and relative to disc spring 12.

Numeral 16 represents only partially, yet generally a clutch hub which is formed radially and integrally with a flange 16a mounting at both sides thereof a main disc plate 13 and an auxiliary disc plate 14. These plates 13 and 14 are somewhat loosely attached to each other by means of rivet or other similar means, not shown, and through the intermediary of a conventional damper unit 15, so as to allow a certain relative rotation between the both plates. This damper unit 15 will serve for transmitting torque from the plates 13 and 14 to clutch hub flange 16a. In practice, however, it should be noted that a plurality of these damper units 15, preferably four in number, are arranged radially with equal mutual peripheral separation, about the axis X-X'. The clutch hub 16 is axially and slidably mounted on output shaft 17 through a spline coupling shown at 17a formed thereon. The left-hand end of said output shaft 17 is concentrically and rotatably mounted in the right-hand end of said crankshaft 1 through antifriction bearing 18.

The boss 16c of clutch hub 16 receives fixedly the right-hand end of an elastic sleeve 19 through pressure fit, axial serrations or the like conventional means, said sleeve being adapted for acting as a part of the positive releaser for clutch disc 3, as will become more apparent as the description proceeds. The sleeve 19 is fixedly attached through, for instance, glueing or the like measure, to the outer peripheral surface of a rubber or the like resilient ring 20 which is rigidly attached again by glueing or the like conventional fixing measure onto the outer peripheral surface of an end sleeve 21 of stepped type. The reduced part 21a of end sleeve 21 is kept in pressure engagement with the inner race 18a of the bearing 18. The outer race of the bearing 18 is press fitted into flange 1a on the shaft 11. By adopting the above structure, said inner race 18a and the boss 16c of clutch hub 16 can perform a unitary revolution and there may be no relative rotation among these members 18a and 16; and other related parts 19, 20 and 21. With the clutch assembly positioned in its clutch-engaging position shown in FIG. 1, a substantial amount of elastic energy for axial thrust is accumulated in the elastic ring 20.

The operation of the mechanism so far shown and described is as follows:

When the driver of the vehicle depresses the conventional clutch pedal, not shown, release bearing 10 is shifted axially and leftwards from its position shown in FIG. 1 to that shown in FIG. 2, as may be easily understood by any person skilled in the art. For this purpose, the clutch pedal is operatively connected with the release bearing, although the necessary motion transmitting means have not been shown since it is conventional. By this leftward sliding movement of the bearing 10, the parts 6b frequently called "tongues" are also caused to shift equally leftward by contact thereof with the moving or moved bearing 10. Therefore, the diaphragm spring 6 will perform a corresponding swivelling movement about the pivot rings 7;7' as its center, as may be well understood by comparison of FIG. 2 with FIG. 1. Thus, the outer ring periphery 6a of the diaphragm spring so far it is shown on the drawing will shift rightward from the position shown in FIG. 1 to that shown in FIG. 2.

In this way, the clutch disc 3 is released from pressure contact by pressure plate 4. Thus, the clutch disc is freed. With the rightward displacement of the outer periphery 6a of diaphragm spring 6, pressure plate 4 is forcibly moved rightwards by the catching action of retracting springs 9.

Although there is a certain amount of sliding resistance at the spline coupling at 17a between the clutch hub 16 and the output shaft 17, clutch disc 3 is moved forcibly rightwards by virtue of the resilient axial pressure released from and exerted by rubber ring 20. It will be seen that upon the execution of clutch release in the above mentioned way, the clutch disc 3 can not be entrained by the rotating flywheel 2 with the engine and its crankshaft 1 kept in rotation. Under these conditions, therefore, a gear shift operation in the transmission gearing can be performed in a smooth way. The positive clutch release means is thus seen as comprised of the members 19–21 of which the rubber ring 20 is predominant in the meaning of the desired operation. Sleeves 19 and 21 also provide certain resiliency in favor of the desired operation.

The sleeves 19 and 21 can be easily fabricated by press job or the like simple and easy machining procedure and these sleeves are connected with each other by rubber or the like resilient ring 20 by glueing or the like conventional attaching means, so as to form a unit, and thus these units can be manufactured on a mass production basis and in a much economical way. In addition, it will be easily seen from the foregoing and in consultation with the accompanying drawings, the attachment of the clutch can be easily performed.

The relative rotation as appearing in case of the clutch release is brought about only through bearing means, and thus, practically no abnormal noise issuance and no excess wear will be encountered which means a substantial progress in the art.

Next, referring to FIGS. 3–6, the second embodiment of the invention will now be described hereinbelow in detail.

The numeral 101 represents partially and schematically an engine crankshaft to which a flywheel 102 is fixedly and concentrically attached by means of fixing bolts, only one of the latter being shown at 130 as a representative. On the outer peripheral of the flywheel, a ring gear member 131 is rigidly mounted, such as by press fit or the like procedure, so as to be driven through a pinion, not shown, by a conventional starter motor, not shown. This structural feature is also embodied in the foregoing first embodiment shown in FIGS. 1 and 2, although not specifically referred to.

At the right-hand side of said flywheel 102 and at relatively outer portion thereof, conventional clutch cover 103, only partially and schematically shown, is fixedly attached by means of a plurality of fixing bolts, not shown. On the inside wall surface of the clutch cover and its relatively outer portion, a plurality of radial arms 111 of a diaphragm spring are mounted each pivotably on a rivet member 109 or screw member which is adjustably, yet fixedly mounted on the clutch cover. More precisely, however, the pivot is constituted by pivot rings 110 and 110' as before. It should be mentioned at this stage that this conventional diaphragm spring having radial springy arms 111 is similar to the corresponding diaphragm spring employed in the foregoing first embodiment, although the structural description was given therein in a more simplified mode. Rivet member 109 is formed at its inner end with an enlarged head 109a in the similar way as before. Pivot rings 110 and 110' are also provided as at 7 and 7' in the first embodiment. In practice, a plurality of these rivet members 109 are arranged radially about the axis X–X'. The radially inner part of diaphragm spring 111 consists of a number of radially converging springy tongues 111a which are arranged to be subjected to a leftwardly an axially directing urging force by contact with a release bearing unit 113 provided at close proximity of their innermost termination ends of said tongues, said ends describing a small circle around the imaginary center of the diagragm spring located on the axis X–X', when imaginarily connecting said tongue ends one after another. Such structure of clutch diaphragm spring 111 is also highly conventional.

The outer peripheral part 111b which has substantially the shape of a ring is kept as conventionally in pressure contact with a ring projection 107a formed on a conventional pressure plate 107. The peripheral ring part 111b of diaphragm spring 111 is squeezed under pressure between said projection 107a and the semicircular sectioned outer parts of a plurality of radially positioned retracting springs 112. The opposite or inner end of each of these retracting springs 112 is fixedly attached to the radially outer peripheral surface of pressure plate 107 by means of a set screw member 132.

Pressure plate 107 is so designed and arranged as conventionally that torque may be transmitted from clutch cover 103 through strap means, not shown, thereto. This structural feature was also embodied in the first embodiment, although not specifically referred to.

There is provided between flywheel 102 and pressure plate 107 a conventional clutch disc plate assembly 106 comprising a pair of disc facing members 114 and 114', a clutch disc spring 115, a main disc plate 116, an auxiliary disc plate 117, a plurality of radially arranged dampers 118 and a clutch hub 119, the latter being coupled slidably with an output shaft 105 through spline coupling 105a.

Disc facing members 114 and 114' are axially movably assembled together by means of a plurality of rivet members of which only one is representatively shown at 133 and attached loosely to clutch disc spring 115 at its both sides. The thus formed assembly is squeezed between flywheel 102 and pressure plate 107 under the influence of axial pressure exerted by diaphragm spring 111. Clutch disc spring 115 is fixed at its lowest or innermost end to main disc plate 116 by means of a plurality of further rivet members of which only one is shown representatively at 135, in a staggered way as shown.

Clutch hub 119 comprises a radial flange 119a' and a boss 119a made integral with each other and said main disc plate 116 and said auxiliary disc plate 117, the both being only partially shown, are attached fixedly to the both side surfaces of said flange 119a' by means of a plurality of rivet members, not shown. For transmitting torque from flywheel 102 through said members 114, 114', 133, 115, 135, 116 and 117 to the flange 119a', there is provided radially arranged conventional damper units 118 each of which is positioned within three openings formed through the members 116, 117 and 119a' in a substantially registration one after another in the axial direction. This structure was also employed in the first embodiment although not specifically referred to hereinbefore. The torque transmitted thus to the clutch hub 119 is naturally transmitted in turn to the output shaft 105 through the spline coupling 105a.

A tubular elastic member or sleeve 121 made of rubber, as an example, is kept by its one end in tight engagement with the boss 119a of clutch hub through a serrated coupling, not shown. This tubular member 121 is formed on its inside wall surface with a number of fine circular grooves 121a with which the correspondingly shaped circular grooves 122c formed on the outer peripheral surface of a larger sleeve part 122a of a stepped sleeve unit 122, is kept in engagement. This unit 122 comprises a smaller or reduced sleeve part 122b. The grooved engagement between 121a and 122c is relatively and axially changed in position when an axial thrust is applied to the elastic sleeve 121, so as to thereby shorten the whole axial length of the thus mutually coupled unit consisting of the two members 121 and 122. As before, the left-hand end of the smaller sleeve part 122b is kept in axial pressure engagement with the inner race 120a of a pilot bearing unit 120 through which the left-hand reduced end of output shaft 105 is rotatably mounted in the crankshaft 101.

Release bearing 113 comprises outer race 113a, bearing balls 113b and inner race 113c, the latter being fixedly mounted on the inner end of a hollow mount 99. This mount 99 is mounted fixedly in turn on an actuator tube shaft 98 arranged concentrically to the output shaft 105 and mounted axially slidable, although the necessary bearing means have been omitted for their very popularity. The outer end, not shown, of this actuator shaft 98 is linked with the clutch pedal not shown.

The operation of the second embodiment is as follows:

When the driver of the vehicle depresses the clutch pedal, not shown, the release bearing 113 will be moved as before leftward in the axial direction from the position shown in FIG. 3. In this way, the tongues 111a of diaphragm spring 111 are inclined as shown in FIG. 4 and the outer ring porton 111b thereof will be inclinedly shifted to the right, thus pressure plate 107 being shifted correspondingly rightwards through the intermediary of retracting springs 112 as before, from the position shown in FIG. 3 to that illustrated in FIG. 4.

In this way, the right-hand side facing member 114' of clutch disc 106 is disengaged from contact with the corresponding side surface of pressure plate 107. At this stage, since there is no member exerting a leftward axial pressure to the disc assembly 106, the tubular member 121 will urge the disc assembly 106 resiliently by its own elastic force to move axially rightward against the frictional resistance at the spline coupling 105a. Therefore, the facing member 114 of disc assembly 106 is caused to be disengaged from contact with flywheel 102. Thus, otherwise invited entrainment of the member 114 by rotating flywheel can effectively be prevented.

With clutch facing members 114 and 114' subjected to substantial wear upon substantial service period of the clutch, clutch hub 119 may be shifted axially leftwards correspondingly to the overall facing wear. Then, the elastic tubular member 121 is subjected to a corresponding axial thrust and the engaging point between the two members 121 and 122 will be changed, so as to correspondingly shorten the overall effective length of the resiliently and positively acting clutch separation unit comprising these two members under consideration. Therefore, the elastic tubular member 121 will recover its regular effective degree of axial resiliency for accumulation of thrust energy during the clutch engaging period and for delivery of such accumulated resilient energy for the desired positive separation of clutch disc assembly 106 from flywheel 102 in case of the clutch release operation. Therefore, the relative position of the related working parts will become from that shown in FIG. 5 to that shown in FIG. 6.

The specific structure of actuator shaft 98 and bearing mount 99 for the release bearing unit 113 is embodied similarly in the first embodiment for the release bearing unit 10.

Although not shown, the bearing unit 18 or 120 may be provided between flywheel 2 and output shaft 17 or 105, in place of the shown position selected between the input and the output shaft.

The embodiments of the invention in which an exclusive property or privilege is claimed are as follows:

1. A vehicle clutch release mechanism comprising, an engine crankshaft having a fly wheel mounted thereon, a cover plate attached to said fly wheel, a pressure plate mounted for axial sliding movement relative to said fly wheel and said cover plate, an output shaft concentrically mounted on and provided between said fly wheel and said pressure plate, said clutch disc assembly having a hub mounted for axial sliding movement on and for rotation in unison with said output shaft, a pilot bearing mounted between said crankshaft and said output shaft having an inner race and an outer race, said outer race being fixed to said crankshaft and said inner race being fixed to said output shaft, and elastic ring means provided between said hub of said clutch disc assembly and said inner race of said pilot bearing for positively releasing said clutch disc assembly from engagement with said fly wheel, said elastic ring means including an elastic sleeve, a resilient ring attached to an inner peripheral surface of said elastic sleeve and a stepped sleeve attached to an inner peripheral surface of said resilient ring.

2. A vehicle clutch release mechanism as set forth in claim 1 wherein said elastic sleeve is connected to said hub and said stepped sleeve is connected to said inner race of said pilot bearing.

3. A vehicle clutch release mechanism comprising, an engine crankshaft having a fly wheel mounted thereon, a cover plate attached to said fly wheel, a pressure plate mounted for axial sliding movement relative to said fly wheel and said cover plate, an output shaft concentrically mounted on and rotatable relative to said crankshaft, a clutch disc assembly provided between said fly wheel and said pressure plate, said clutch disc assembly having a hub mounted for axial sliding movement on and for rotation in unison with said output shaft, a pilot bearing mounted between said crankshaft and said output shaft having an inner race and an outer race, said outer race being fixed to said crankshaft and said inner race being fixed to said output shaft, and elastic ring means provided between said hub of said clutch disc assembly and said inner race of said pilot bearing for positively releasing said clutch disc assembly from engagement with said fly wheel, said elastic ring means including a resilient part having a number of fine circular grooves on the inside wall surface thereof and a sleeve having a larger sleeve part with circular grooves corresponding to said fine circular grooves on the outer peripheral surface thereof and a smaller sleeve part.

4. A vehicle clutch release mechanism as set forth in claim 3 wherein said resilient part is connected to said hub and said smaller sleeve part is connected to said inner race of said pilot bearing.

5. A vehicle clutch release mechanism as set forth in claim 3 wherein said fine circular grooves of said resilient part and said circular grooves of said larger sleeve part are frictionally interconnected to permit longitudinal adjustment to regulate the longitudinal lengths by a relative movement of said part upon wearing of said clutch disc assembly.

* * * * *

UNITED STATES PATENT OFFICE
CERTIFICATE OF CORRECTION

Patent No. 3,773,155          Dated November 20, 1973

Inventor(s) Saburo FUJITA et al

It is certified that error appears in the above-identified patent and that said Letters Patent are hereby corrected as shown below:

Column 7, line 43, between "plate," and "said" insert the following:

--a clutch disc assembly provided between said fly wheel and said pressure plate--.

Signed and sealed this 15th day of October 1974.

(SEAL)
Attest:

McCOY M. GIBSON JR.
Attesting Officer

C. MARSHALL DANN
Commissioner of Patents